March 26, 1929. G. E. MILLER 1,706,408

PASTE BRUSH

Filed March 21, 1927

INVENTOR:
George E. Miller
BY Craig H Mayer
ATTORNEYS

Patented Mar. 26, 1929.

1,706,408

UNITED STATES PATENT OFFICE.

GEORGE E. MILLER, OF BOSTON, MASSACHUSETTS, ASSIGNOR TO THE CARTER'S INK COMPANY, OF CAMBRIDGE, MASSACHUSETTS, A CORPORATION OF MASSACHUSETTS.

PASTE BRUSH.

Application filed March 21, 1927. Serial No. 176,973.

The invention relates to an improvement in paste brushes or the like made of rubber or similar elastic material.

The object of the invention is to provide in such a brush an elastic wiping member possessing such flexibility that when the member is brought into wiping contact with an object it will have a side surface wiping contact with the object as differentiated from a wiping edge contact therewith, the wiping member at the same time not being flabby or flaccid, which is a thing to be avoided, excepting in its outer end portion which is left more or less flabby or flaccid as is desirable.

The invention can best be seen and understood by reference to the drawings in which—

Referring to the drawings:—

Figure 1:
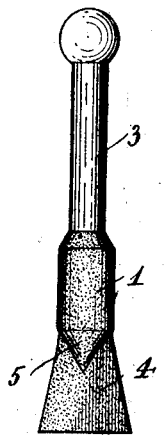
Figure 1 shows the brush in front elevation.
Figure 2:
Fig. 2 is a side elevation.
Figure 3:
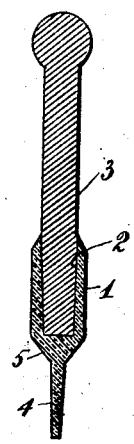
Fig. 3 is a cross vertical section.

1 represents the shank portion of the brush having within it a socket 2 into which fits a handle 3. Extending from the forward end of the shank is a wiping member 4. Extending also from the shank with projection onto the opposite sides of the wiping member are reinforcing members 5, 5.

The shank 1, wiping member 4 and reinforcing members 5, 5 may be, and preferably are in one integral moulded piece, being made out of rubber or similar material in order that a certain amount of elasticity may reside in the shank so that it may tightly hug the end of the handle inserted within its socket and in order also that elasticity coupled with flexibility may reside in the wiping member 4 and the reinforcing members 5, 5.

Figure 4:
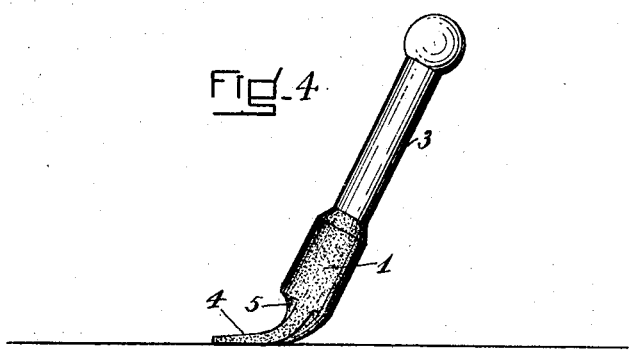
Fig. 4 is a side elevation showing the brush when its wiping member is in wiping contact with an object.

The shank 1 is preferably tubular in form. The wiping member 4 projecting from the forward end of the shank is preferably made to widen from the point of the shank to the outer end of the member. The wiping member is also made sufficiently thin to be quite flexible, that is, so thin that when the wiping member is brought into wiping contact with an object as shown in Fig. 4 the side of the member will have surface contact with the object.

The wiping member when made thus flexible is in itself too flabby or flaccid to function properly as a brush and at the same time owing to such flexibility would throw a severe strain on the joint between it and the shank causing disruption in course of time. This is prevented, however, by the reinforcing members 5, 5 which extend from the bottom of the shank downwardly with substantially V-shaped projection onto the opposite sides of the wiping member, the reinforcing members gradually lessening in amount or size until they merge into the side surfaces of the wiping member. In this way the flexibility of the wiping member is so retained that it will present a broad side face to the object when brought into wiping contact with it as shown in Fig. 4, the reinforcing members themselves bending to permit of such bending or flexibility in the entire wiping member, at the same time so stiffening the wiping member as to prevent flabbiness excepting at the outer end of the member where a certain amount of flabbiness is desirable. The reinforcing members also give necessary strength at the point of the joint between the shank and the wiping member, making the wiping member turn relatively to the shank on a relatively wide bending line instead of a narrow sharply defined line as would be the case if the reinforcing members for the wiping member were not provided.

By the term "rubber" as used herein and in the claim is meant either rubber or material or composition having the characteristics of rubber.

Having thus fully described my invention, I claim and desire to secure by Letters Patent of the United States:—

A paste brush or the like made of rubber comprising a shank having within it a socket, a handle fitting within the socket, a relatively thin wiping member extending from the shank and possessing body flexibility, and an elastic reinforce for the wiping member having a substantially V-shaped projection from the shank onto the opposite sides of the wiping member, the reinforce gradually lessening in amount as extension is made onto the sides of said member.

GEORGE E. MILLER.